(12) United States Patent
Park

(10) Patent No.: US 12,157,352 B2
(45) Date of Patent: Dec. 3, 2024

(54) WEATHER STRIP FOR VEHICLE

(71) Applicants: Hyundai Motor Company, Seoul (KR); Kia Corporation, Seoul (KR)

(72) Inventor: Seung-Young Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/960,543

(22) Filed: Oct. 5, 2022

(65) Prior Publication Data

US 2023/0202277 A1    Jun. 29, 2023

(30) Foreign Application Priority Data

Dec. 23, 2021   (KR) .................. 10-2021-0185948

(51) Int. Cl.
*B60J 10/248*   (2016.01)
*B60J 10/84*   (2016.01)
*B60J 10/86*   (2016.01)

(52) U.S. Cl.
CPC ............. *B60J 10/248* (2016.02); *B60J 10/84* (2016.02); *B60J 10/86* (2016.02)

(58) Field of Classification Search
CPC .. E05F 15/44; E05F 15/46; B60J 10/24; B60J 10/248; B60J 10/27; B60J 10/277; B60J 10/273; B60Y 2200/143
See application file for complete search history.

(56) References Cited

U.S. PATENT DOCUMENTS

| | | | | |
|---|---|---|---|---|
| 6,740,826 | B1 * | 5/2004 | Friedrich | H01H 3/142 200/61.81 |
| 8,593,161 | B2 * | 11/2013 | Kato | B60J 1/17 324/661 |
| 8,854,061 | B2 * | 10/2014 | Suhara | E05F 15/46 49/27 |
| 9,570,247 | B2 * | 2/2017 | Clemente | E05F 15/46 |
| 10,844,645 | B2 * | 11/2020 | Hirtenlehner | E05F 15/44 |
| 11,135,908 | B2 * | 10/2021 | Park | B60J 10/86 |
| 11,434,687 | B2 * | 9/2022 | Grein | B60Q 1/324 |
| 2019/0186190 | A1 * | 6/2019 | Akimoto | E05F 15/44 |
| 2021/0002941 | A1 * | 1/2021 | Akimoto | E05F 15/44 |

FOREIGN PATENT DOCUMENTS

KR    19990022991 U   *  7/1999
KR    2007-0047465 A     5/2007

OTHER PUBLICATIONS

KR19990022991U translation from Google Patents (Year: 1999).*

* cited by examiner

*Primary Examiner* — Janet M Wilkens
*Assistant Examiner* — Susan M. Heschel
(74) *Attorney, Agent, or Firm* — Fox Rothschild LLP

(57) ABSTRACT

Provided is a weather strip for a vehicle according to the present disclosure. The weather strip includes: a fixing part fixed to a vehicle body or an opening/closing part of a vehicle; a sealing part formed on one side of the fixing part and formed in a hollow cross section therein to seal between the vehicle body and the opening/closing part; a sensor installation part positioned to be spaced apart from an inner surface of the sealing part in the sealing part and accommodating an anti-pinch sensor therein; and at least one sensor operation part protruding from the inner surface of the sealing part toward the sensor installation part by a predetermined length in the inner surface of the sealing part to pressurize the sensor installation part when the sealing part is deformed by an external force.

16 Claims, 6 Drawing Sheets

WEATHER STRIP FOR VEHICLE

CROSS-REFERENCE TO RELATED APPLICATION

This application is based on and claims under 35 U.S.C. § 119(a) priority to Korean Patent Application No. 10-2021-0185948, filed on Dec. 23, 2021, which is incorporated herein by reference in its entirety.

TECHNICAL FIELD

Embodiments of the present disclosure relate to a weather strip for a vehicle, which seals between a door and a vehicle body in a vehicle, and more specifically, to a weather strip for a vehicle, which improves the detection performance of an anti-pinch sensor installed therein.

DESCRIPTION OF RELATED ART

A weather strip for sealing when a door is closed is applied to a door of a vehicle, etc.

In addition, a sensor is installed to detect that a passenger's body is pinched between the door and a vehicle body while the door is opened or closed.

For example, in a bus 100 for transporting passengers, a front door is composed of a folding door 120 in which a first member 121 and a second member 122 are folded (see FIG. 1), and an anti-pinch sensor (APS) is installed to detect that the passenger's body is pinched between the door and the vehicle body with which the door is in contact.

In FIG. 2, when the anti-pinch sensor 150 is installed in a weather strip 112 installed on the vehicle body and the passenger's body such as a hand (H) is pinched, a resistance of the anti-pinch sensor 150 is changed by the deformation of the weather strip 112 and the anti-pinch sensor 150 to detect the pinch.

While the folding door 120 is closed, when the pinch is detected by the anti-pinch sensor 150, an actuator 131 configured to operate the first member 121 controls the folding door 120 to be opened. When the actuator 131 operates to open the first member 121 through the rod 132, the first member 121 and the second member 122 are folded to open the folding door 120, thereby preventing the pinch.

Since the anti-pinch sensor 150 is installed in the weather strip 112, an initial installation position should be maintained. However, since the weather strip 112 is formed in a simple shape as shown in FIG. 2 and cannot stably support the anti-pinch sensor 150. Therefore, the anti-pinch sensor 150 installed in the weather strip 112 cannot maintain its position and is separated from the weather strip 112.

Also, in addition to the basic sealing function, the weather strip 112 needs to smoothly deliver external deformation to the inside so that the anti-pinch sensor 150 can easily detect the pinch when the pinch occurs.

However, since the conventional weather strip 112 focuses on the sealing function, the displacement due to the change thereof is not sufficiently delivered to the inside even when the outside of the weather strip 112 changes, and therefore, the anti-pinch sensor 150 does not detect the pinch well.

Meanwhile, the weather strip 140 can be configured to be fitted into a door frame 122a in the second member 122 composed of the door frame 122a and a door panel 122b (see FIG. 3), and the anti-pinch sensor 150 can be installed in the weather strip 140. However, even in this case, there is the aforementioned problem.

The contents described in Description of Related Art are to help the understanding of the background of the present disclosure and may include what is not previously known to those skilled in the art to which the present disclosure pertains.

SUMMARY

In one embodiment, a weather strip for a vehicle is provided, which preferably is configured to deliver a deformation force to an anti-pinch sensor installed therein without loss when an appearance is changed by the pinch, thereby enhancing detection performance of the sensor.

In an embodiment, a weather strip for a vehicle is provided that comprises: a) a fixing part suitably configured to be fixed to a vehicle body or an opening/closing part of a vehicle; b) a sealing part on one side of the fixing part to seal between the fixing part and the vehicle body and the opening/closing part; c) a sensor installation part comprising an anti-pinch sensor therein; and d) at least one sensor operation part to pressurize the sensor installation part when the sealing part is activated.

In certain embodiments, suitably the sealing part is formed in a cross section of the fixing part, including in a hollow or other shaped cross-section of the fixing part.

In certain embodiments, suitably the sensor installation part is positioned to be spaced apart from an inner surface of the sealing part.

In certain embodiments, the at least one sensor operation part protrudes from the inner surface of the sealing part toward the sensor installation part.

In certain embodiments, the at least one sensor operation part protrudes by a predetermined length in the inner surface of the sealing part.

In certain embodiments, preferably the sealing part is configured to be activated by being deformed, such as where the sealing part is configured to be activated by being deformed by an external force, e.g. as may be applied by a vehicle user.

In an embodiment, a weather strip for a vehicle includes: a fixing part fixed to a vehicle body or an opening/closing part of a vehicle; a sealing part formed on one side of the fixing part and formed in a hollow cross section therein to seal between the vehicle body and the opening/closing part; a sensor installation part positioned to be spaced apart from an inner surface of the sealing part in the sealing part and accommodating an anti-pinch sensor therein; and at least one sensor operation part or projection protruding from the inner surface of the sealing part toward the sensor installation part by a predetermined length in the inner surface of the sealing part to pressurize the sensor installation part when the sealing part is deformed by an external force.

A sensor support part is suitably formed so that the sensor installation part connects the inner surface of the sealing part and the fixing part.

In one embodiment, the sensor support part is suitably formed on a portion of the sensor installation part facing the fixing part or a side surface thereof.

In one embodiment, among the sensor support parts, the sensor support parts, formed on the side part of the portion faced the fixing part at the sensor installation part, are formed to be inclined.

In certain embodiments, the sensor operation part may be formed to face a portion of the sensor installation part where the sensor support part is not installed.

In certain embodiments, the sensor operation part may be formed at a predetermined angular interval.

In certain embodiments, a predetermined gap is formed between the sensor operation part and the sensor installation part.

In certain embodiments, the sensor installation part is formed to be inclined at a predetermined angle with respect to a longitudinal direction of the vehicle.

In certain embodiments, the sensor installation part is formed to be inclined at about 15 degrees with respect to the longitudinal direction of the vehicle.

In certain embodiments, the vehicle is a bus. In certain embodiments of where the vehicle is a bus, the opening/closing part is a folding door opened or closed as a first member and a second member are folded.

In an embodiment, the fixing part is fixed to a door frame of the second member.

In an embodiment, the fixing part is fixed to a panel of the vehicle body with which an end of the folding door is in contact.

According to the weather strip for the vehicle according to embodiments of the present disclosure having the above configuration, it is possible to firmly support the anti-pinch sensor through the support part, thereby preventing or minimizing the phenomenon in which the anti-pinch sensor is separated.

In addition, when the deformation is caused by the pinch, it is possible to smoothly deliver the deformation force to the anti-pinch sensor therein without loss, thereby improving the detection performance of the anti-pinch sensor.

As discussed, the system suitably includes use of a controller or processor.

In another embodiment, vehicles are provided that comprise a weather strip as disclosed herein. Preferred vehicles may include a bus.

DESCRIPTION OF SPECIFIC EMBODIMENTS

Figure 1:
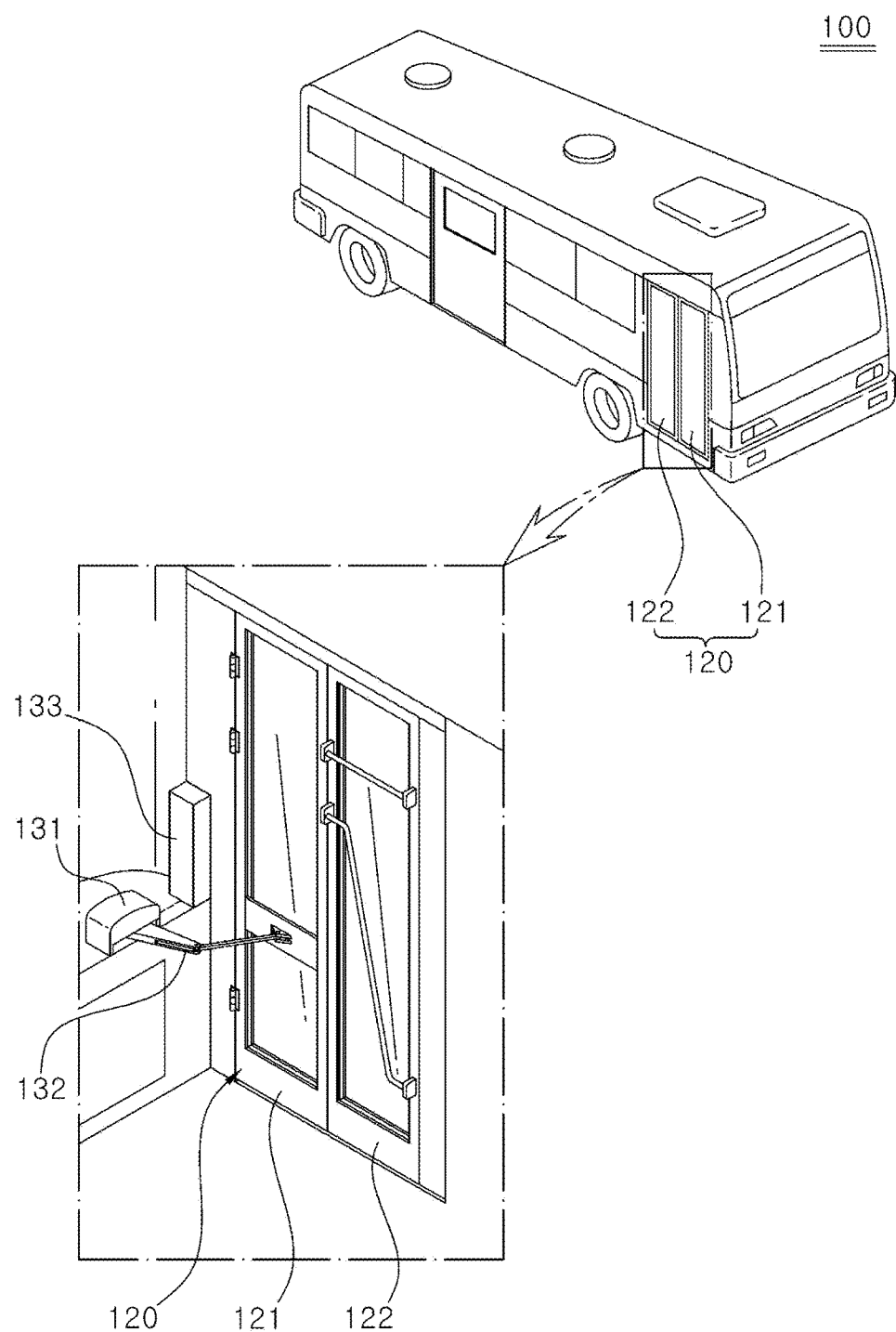
FIG. 1 is a schematic diagram showing a structure of a folding door in a bus.
Figure 2:
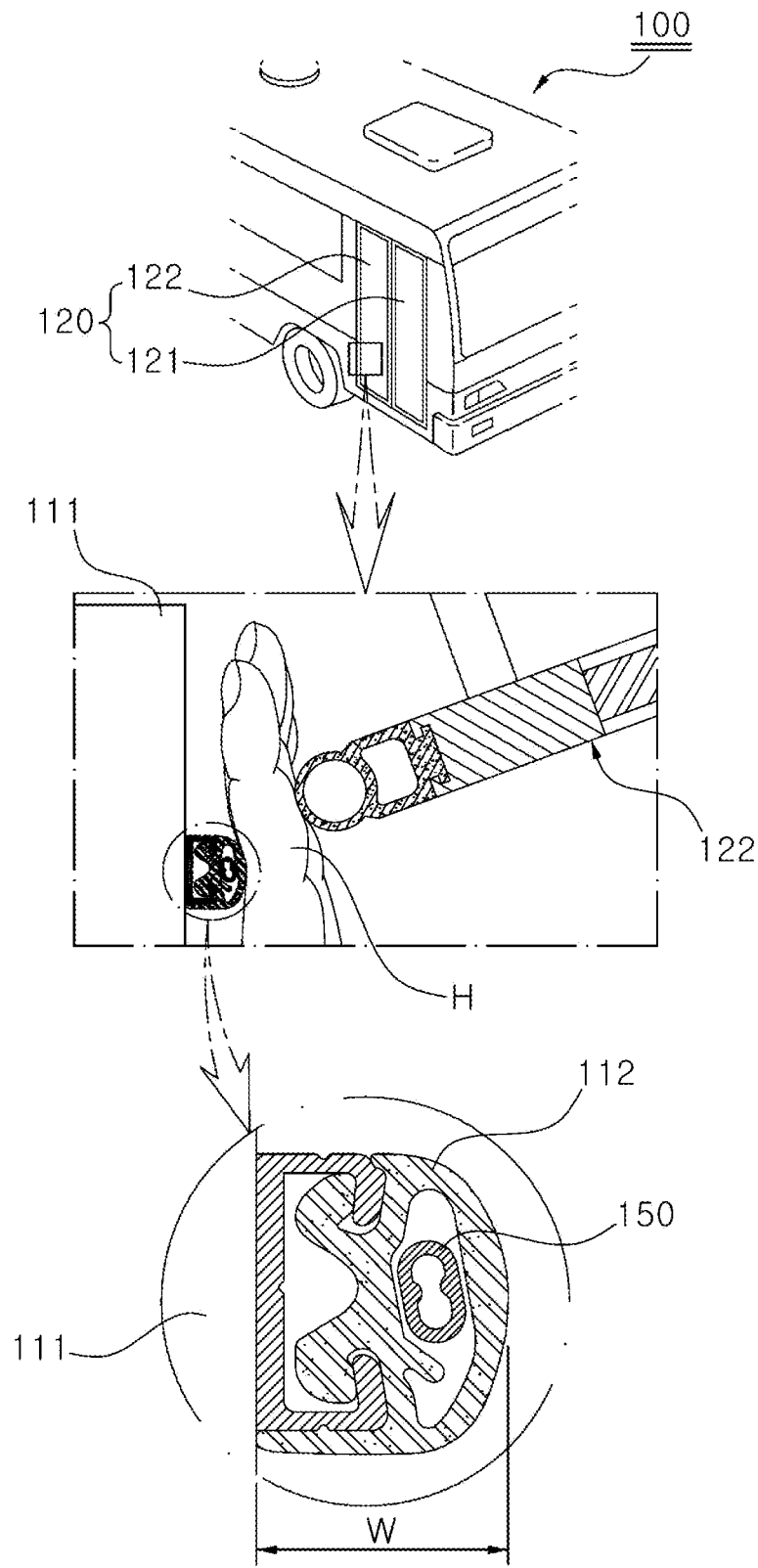
FIG. 2 is a schematic diagram showing a state where an anti-pinch sensor is installed on a vehicle body side and operated.
Figure 3:
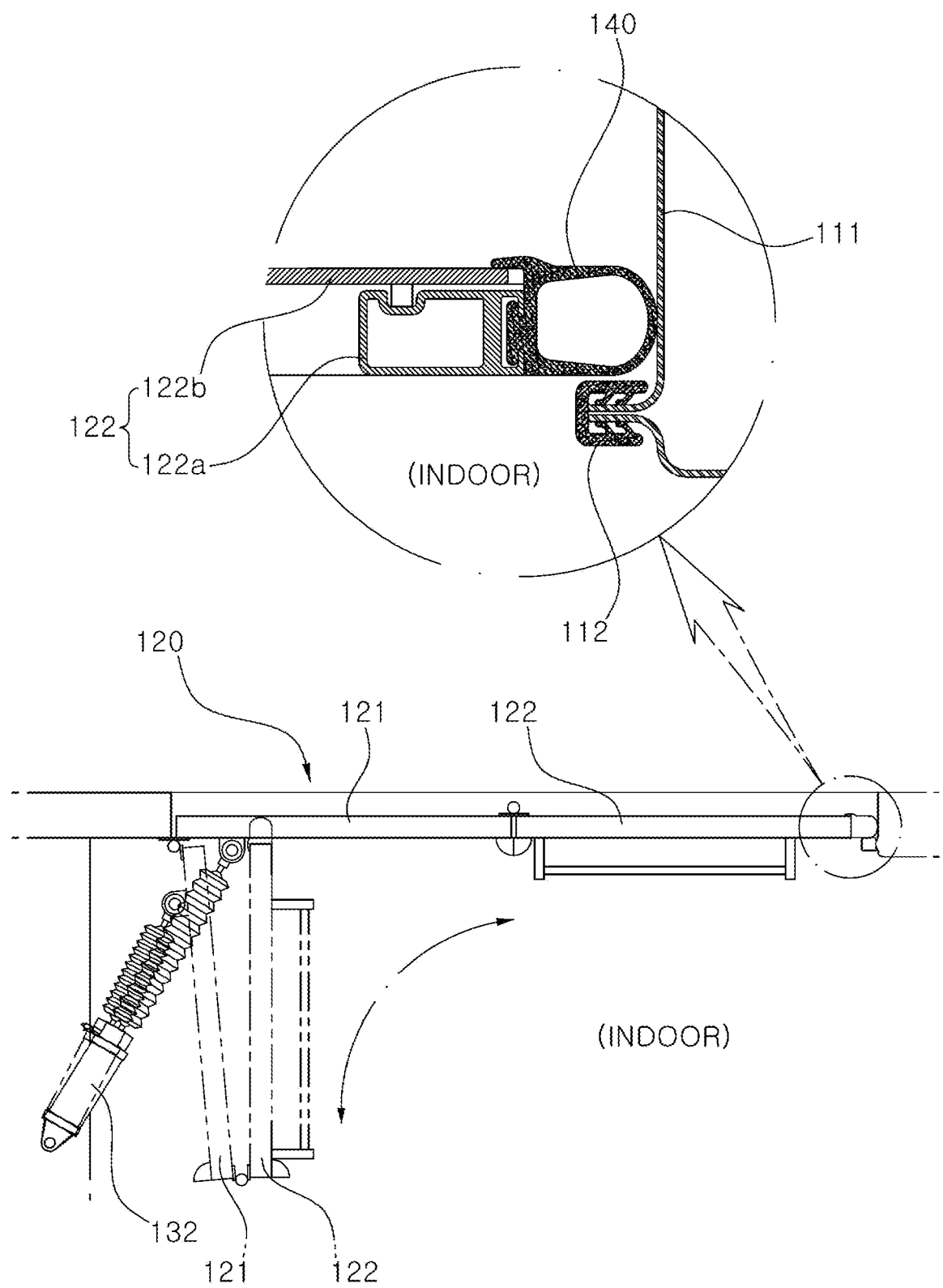
FIG. 3 is a schematic diagram showing a folded state of the folding door in the bus, and a cross-sectional diagram of a weather strip installed on the end of the folding door.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a weather strip for a vehicle according to the present disclosure will be described in detail with reference to the accompanying drawings.

A weather strip for a vehicle according to the present disclosure may include a fixing part 41 fixed to a vehicle body or an opening/closing part 20 for a vehicle, a sealing part 42 formed on one side of the fixing part 41 and formed in a hollow cross section therein to seal between the vehicle body and the opening/closing part 20, a sensor installation part 43 positioned in the sealing part 42 to be spaced apart from an inner surface of the sealing part 42 and accommodating the anti-pinch sensor 50 therein, and at least one sensor operation part 45 protruding from the inner surface of the sealing part 42 toward the sensor installation part 43 by a predetermined length in the inner surface of the sealing part 42 to pressurize the sensor installation part 43 when the sealing part 42 is deformed by an external force.

The weather strip 40 according to the present disclosure may be applied to the opening/closing part 20 of the vehicle and applied to seal between the opening/closing part 20 and the vehicle body of the vehicle. In particular, the weather strip 40 may have the anti-pinch sensor 50 configured to detect that a passenger's body is pinched between the opening/closing part 20 and the vehicle body installed therein when the opening/closing part 20 is operated.

For example, the vehicle can be the bus, the opening/closing part 20 may be the folding door 20 opened or closed by operating the first member 21 and the second member 22 in a folding manner to allow passengers to get on or off the bus.

The folding door 20 may be composed of the first member 21 hinge-connected to the vehicle body and the second member 22 hinge-connected to the first member 21. When the actuator 31 operates to open the folding door 20, the rod 32 pulls the first member 21, and the first member 21 and the second member 22 may be folded. When the actuator 31 operates to close the folding door 20, the rod 32 pushes the first member 21, and the first member 21 and the second member 22 may be unfolded and closed.

The anti-pinch sensor 50 may be installed on the end of the second member 22 to detect the pinch when the folding door 20 is completely closed.

Figure 4:
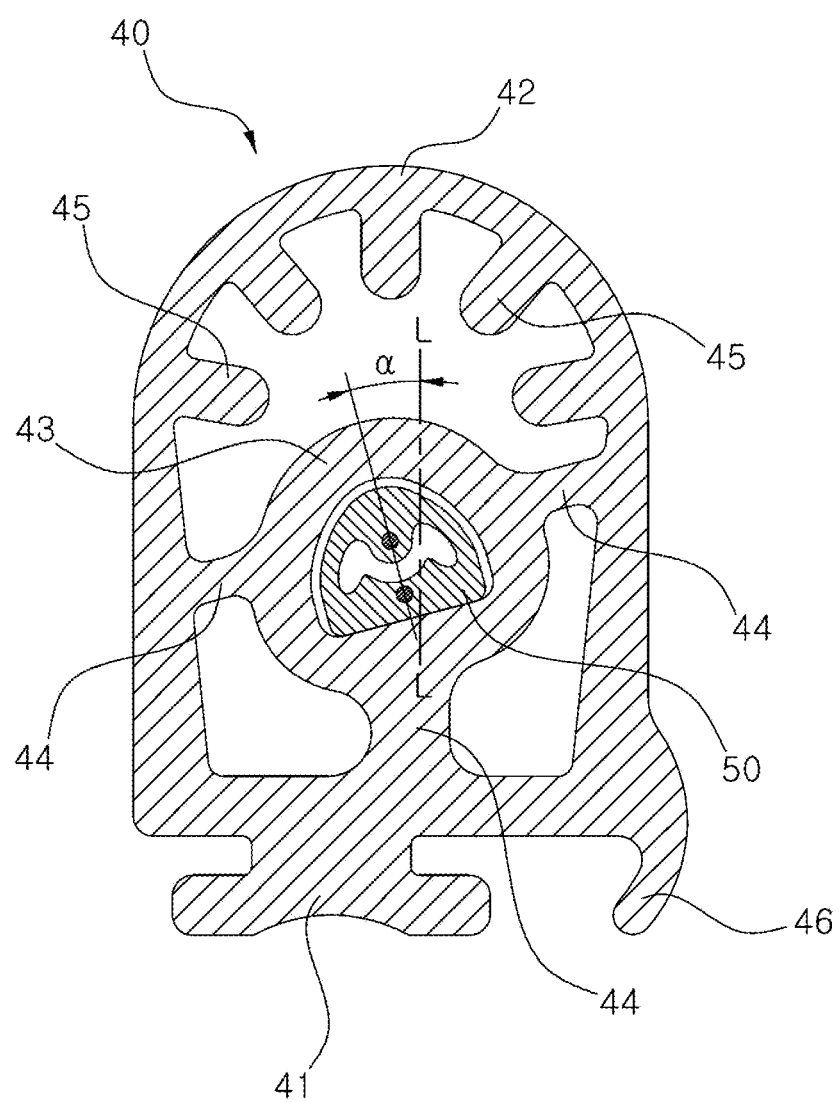
FIG. 4 is a cross-sectional diagram of the weather strip for the vehicle according to embodiments of the present disclosure.
Figure 5:
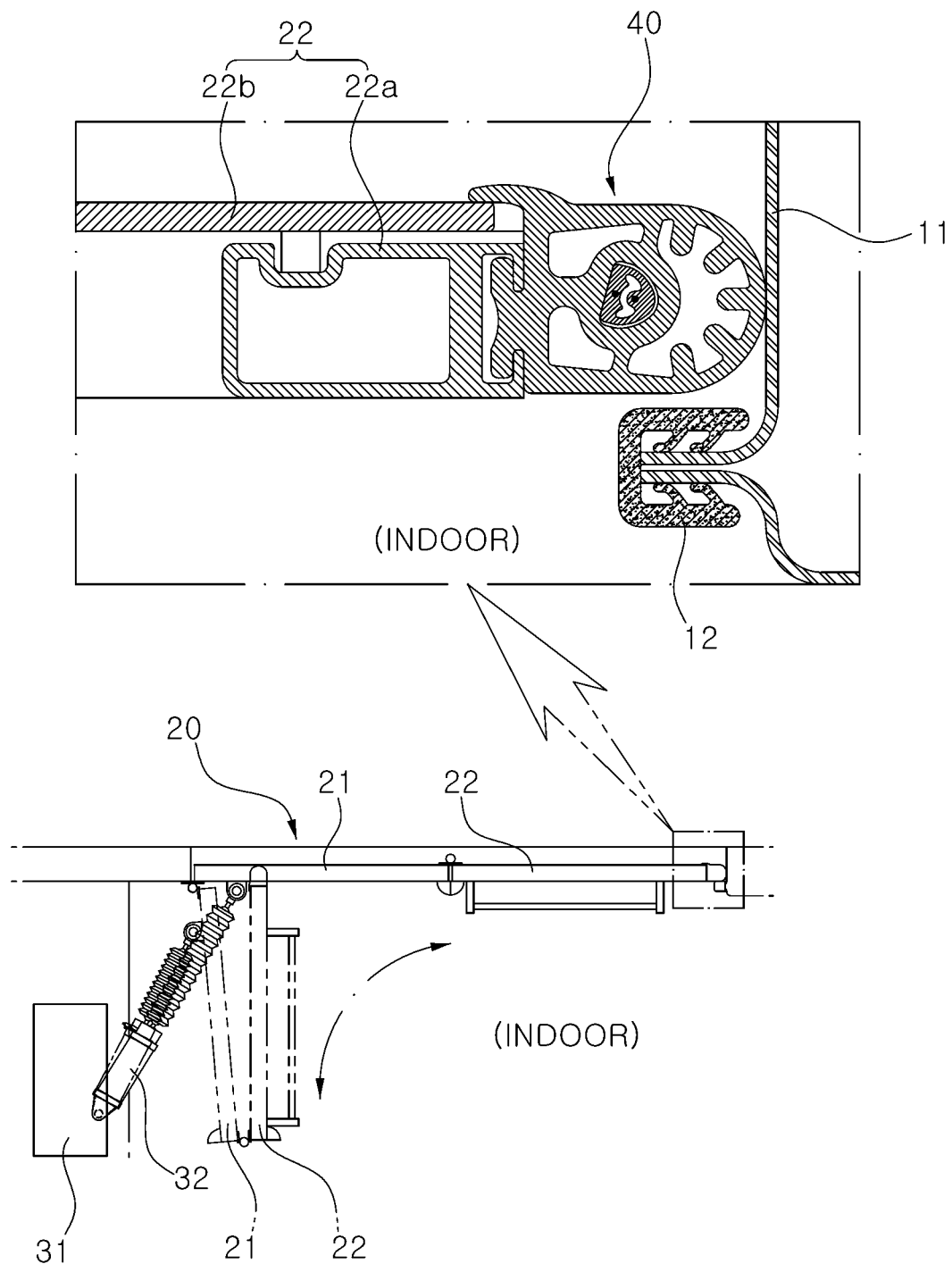
FIG. 5 is a cross-sectional diagram showing a state where the weather strip for the vehicle according to embodiments of the present disclosure is installed on a door.

FIG. 4 shows a cross-sectional diagram of the weather strip 40 for the vehicle according to the present disclosure. The weather strip 40 may be installed on one side of the folding door 20.

The fixing part 41 may fix the weather strip 40 to the opening/closing part 20 of the vehicle, that is, the folding door 20. The fixing part 41 may fix the weather strip 40 to the second member 22 of the folding door 20. The second member 22 may be composed of a door frame 22a and a door panel 22b provided on the door frame 22a, and the fixing part 41 may be fixed to the door frame 22a, and therefore, the weather strip 40 may be fixed to the door frame 22a.

The sealing part 42 may be formed on one side of the fixing part 41. The sealing part 42 may be formed in a hollow cross section therein, and therefore, when the folding door 20 is in contact with the vehicle body upon closing the folding door 20, the folding door 20 may be easily deformed to seal between the folding door 20 and the vehicle body.

The sensor installation part 43 may be formed in the sealing part 42. The sensor installation part 43 may accommodate the anti-pinch sensor 50 therein, and the anti-pinch sensor 50 may be installed in the sensor installation part 43. The anti-pinch sensor 50 may be formed by a predetermined length in a height direction to detect that the passenger's body is pinched between the second member 22 and the vehicle body when the folding door 20 is closed. The anti-pinch sensor 50 may be inserted into the sensor installation part 43 to detect the pinch.

The sensor support part 44 may allow the sensor installation part 43 to be spaced apart from the inner surface of the sealing part 42 in the sealing part 42. The sensor support part 44 may be formed to connect the inner surface of the weather strip 40 with the outer surface of the sealing part 42 to support the sensor installation part 43. In addition, the sensor support part 44 may be formed to connect the inner surface of the sealing part 42 with the sensor installation part 43 or to connect the fixing part 41 with the sensor installation part 43. In other words, the sensor support part 44 may be formed on a portion of the sensor installation part 43 facing the fixing part 41 and the side surface thereof. The sensor installation part 43 may be supported by a plurality of sensor support parts 44, and therefore, may be positioned on the center of the sealing part 42.

Since the sensor installation part 43 is supported by the sensor support part 44 and formed to be spaced apart from the inner surface of the sealing part 42 in the sealing part 42, the position of the anti-pinch sensor 50 may be maintained. In addition, when the sealing part 42 is deformed, the anti-pinch sensor 50 may operate smoothly.

The sensor operation part 45 may be formed in the inner surface of the sealing part 42 to protrude from the inner surface of the sealing part 42 toward the sensor installation part 43 by a predetermined length. Since the sensor operation part 45 is formed to protrude from the inner surface of the sealing part 42, the sensor installation part 43 may be pressurized when the sealing part 42 is deformed by an external force, thereby improving the detection performance of the anti-pinch sensor 50.

The sensor operation part 45 may have the end protruding from the sealing part 42 at a gap from the sensor installation part 43. If the sealing part 42 is normally deformed (e.g., when the normal folding door is closed), the sensor operation part 45 may not press the sensor installation part 43. But if the sealing part 42 is excessively pressed (e.g., if the passenger's body is pinched between the folding door and the vehicle body), the sensor operation part 45 may press the sensor installation part 43.

The sensor operation part 45 may be formed to face a portion of the sensor installation part 43 where the sensor support part 44 is not installed. In other words, in FIG. 4, since the sensor support part 44 is formed on the side surface and lower side of the sensor installation part 43, the sensor operation part 45 may be formed on the inner surface of the sealing part 42 to face an upper portion of the sensor installation part 43.

Since the sensor operation part 45 is formed at a predetermined angular interval, when the sealing part 42 is excessively pressed regardless of the direction, the sensor installation part 43 may be pressurized so that the anti-pinch sensor 50 is operated.

Figure 6:
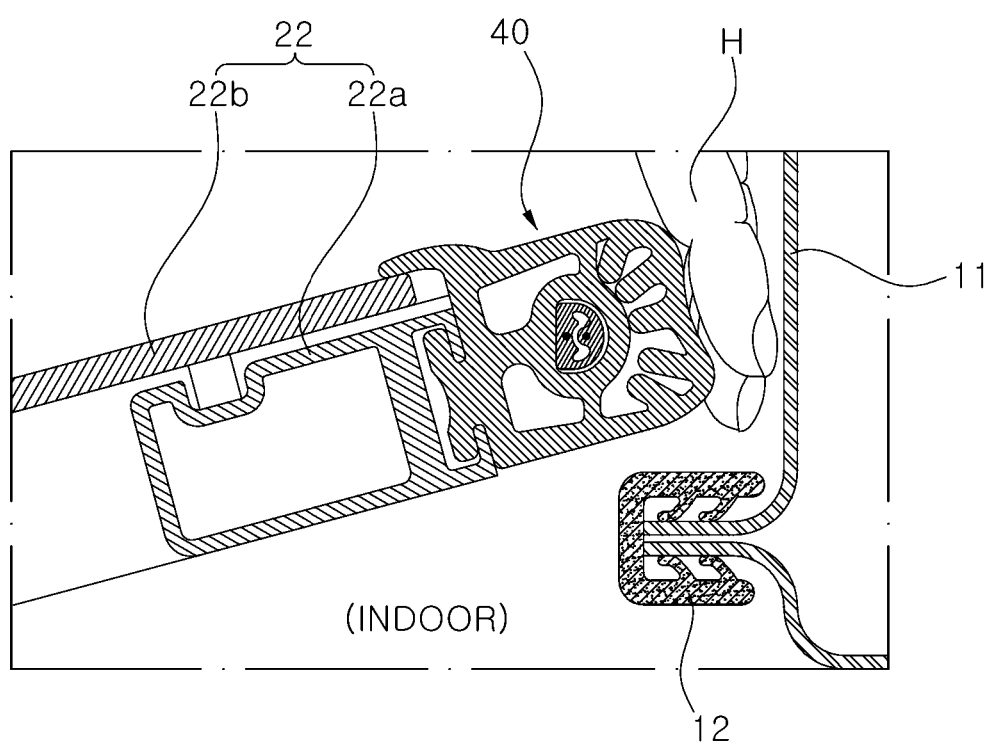
FIG. 6 is a cross-sectional diagram showing a state where the pinch occurs between the weather strip and the vehicle body for the vehicle according to embodiments of the present disclosure.

Meanwhile, the sensor installation part 43 may be formed to be inclined at a predetermined angle. As shown in FIG. 4, the sensor installation part 43 may be formed to be inclined at the predetermined angle with respect to a longitudinal direction (line L-L) of the vehicle. For example, the sensor installation part 43 may be formed to be inclined by 15 degrees with respect to the longitudinal direction of the vehicle. Therefore, as shown in FIG. 6, since the second member 22 performs a closing operation while rotating, it is intended to be pressed to be almost perpendicular to the anti-pinch sensor 50 at any position during the closing operation. Immediately before the folding door 20 is closed, the angle at which the sensor installation part 43 is installed may be formed to be in the same direction as the longitudinal direction of the vehicle, so that the sensor operation part 45 easily presses the sensor installation part 43 if the sealing part 42 is pressed by the pinch.

Meanwhile, among the sensor support parts 44, the sensor support parts 44, formed on the side part of the portion faced the fixing part at the sensor installation part, may be also formed to be inclined. Therefore, immediately before the folding door 20 is closed, the sensor support part 44 connecting the sealing part 42 with the sensor installation part 43 may be formed to be in the same direction as the width direction of the vehicle, so that the sensor support part 44 firmly supports the sensor installation part 43 when the pinch occurs to support the sensor installation part 43 not to be pushed even when the sensor operation part 45 presses the sensor installation part 43, thereby improving the detection performance of the anti-pinch sensor 50.

The inclination of the sensor support part 44 and the inclination of the sensor installation part 43 may be formed at the same angle but are not limited thereto.

Reference numeral 46 (not described) indicates a lip that covers the door panel 22b when the weather strip 40 is fastened to the door frame 22a.

Meanwhile, the structure of the weather strip may also be applied into the weather strip 12 fitted into the panel of the vehicle body instead of being applied to the second member 22 of the folding door 20. In other words, the fixing part 41 of the weather strip may also be fixed to the panel of the vehicle body with which the end of the folding door 20 is in contact.

What is claimed is:

1. A weather strip for a vehicle comprising:
a fixing part configured to be fixed to the vehicle;
a sealing part on one side of the fixing part to seal between the fixing part and the vehicle body and an opening/closing part;
a sensor installation part comprising an anti-pinch sensor therein; and
at least one sensor operation part of a plurality of sensor operation parts, the at least one sensor operation part configured to pressurize the sensor installation part when the sealing part is activated,
wherein the sensor operation parts are arranged radially so that an end of each of the sensor operation parts faces the sensor installation part,
wherein the sensor operation parts are formed at a predetermined angular interval from each other,
wherein sensor support parts are formed so that the sensor installation part connects an inner surface of the sealing part or the fixing part,
wherein an end of the at least one sensor operation part is formed to be convex toward the sensor installation part such that if the sealing part is pressed, the end of the at least one sensor operation part is configured to contact the sensor installation part,
wherein at least one of the sensor support parts that is adjacent to the at least one sensor operation part is formed to be inclined,
wherein the sensor installation part is formed to be inclined at a predetermined angle with respect to a longitudinal direction of the vehicle, and
wherein the at least one sensor support part and the sensor installation part are inclined in a same direction.

2. The weather strip of claim 1 wherein the fixing part is configured to be fixed to a vehicle body or the opening/closing part of the vehicle.

3. The weather strip of claim 2, wherein the vehicle is a bus, and the opening/closing part is a folding door opened or closed as a first member and a second member are folded.

4. The weather strip of claim 3, wherein the fixing part is fixed to a door frame of the second member.

5. The weather strip of claim 3, wherein the fixing part is fixed to a panel of the vehicle body with which an end of the folding door is in contact.

6. The weather strip of claim 1, wherein the sealing part is formed as a hollow cross section by extending from the fixing part.

7. The weather strip of claim 1, wherein the sensor installation part is positioned to be spaced apart from the inner surface of the sealing part.

8. The weather strip of claim 7 wherein the at least one sensor operation part protrudes by a predetermined length in the inner surface of the sealing part.

9. The weather strip of claim 8 wherein the sealing part is configured to be activated by being deformed.

10. The weather strip of claim 8 wherein the sealing part is configured to be activated by being deformed by an external force.

11. The weather strip of claim 1 wherein the at least one sensor operation part protrudes from the inner surface of the sealing part toward the sensor installation part.

12. The weather strip of claim 1, wherein the sensor support parts are formed on a portion of the sensor installation part facing the fixing part or a side surface thereof.

13. The weather strip of claim 12, wherein the at least one sensor operation part is formed to face a portion of the sensor installation part where the sensor support parts are not installed.

14. The weather strip of claim 1, wherein a predetermined gap is formed between the at least one sensor operation part and the sensor installation part.

15. The weather strip of claim 1, wherein the sensor installation part is formed to be inclined at 15 degrees with respect to the longitudinal direction of the vehicle.

16. A vehicle comprising a weather strip of claim 1.

* * * * *